US005505430A

United States Patent [19]
Barnett

[11] Patent Number: 5,505,430
[45] Date of Patent: Apr. 9, 1996

[54] APPARATUS FOR REMOVING AND INSTALLING TOILET BOWLS

[76] Inventor: Charles W. Barnett, 5208 River Rd., Fairfield, Ohio 45014

[21] Appl. No.: 285,275

[22] Filed: Aug. 3, 1994

[51] Int. Cl.[6] .................................................. B60P 1/14
[52] U.S. Cl. .......................... 254/2 R; 254/4 R; 269/15; 269/17
[58] Field of Search .................... 141/98, 231, 364, 141/383, 386; 280/47.34; 414/332; 220/573, DIG. 6; 4/661; 269/15, 17; 254/7 R, 2 R, 4 R, 133

[56] References Cited

U.S. PATENT DOCUMENTS

| | | | |
|---|---|---|---|
| 4,306,707 | 12/1981 | Roscoe, Jr. | 254/4 R |
| 4,722,511 | 2/1988 | Chitwood | 254/7 R |
| 5,184,653 | 2/1993 | Lacy | 269/15 |
| 5,203,065 | 4/1993 | Peters | 254/2 R |
| 5,366,208 | 11/1994 | Benjamin | 269/15 |
| 5,366,338 | 11/1994 | Mortensen | 254/4 R |
| 5,373,593 | 12/1994 | Decky et al. | 254/7 R |
| 5,425,614 | 6/1995 | Perussi et al. | 254/4 R |

*Primary Examiner*—Robert C. Watson

[57] ABSTRACT

An apparatus for removing and installing toilet bowls comprising a frame assembly formed of a lower rectangular support structure having parallel side supports, a front support and a rear support, an upper support structure having parallel side supports located above the lower side supports and a front support coupled therebetween, vertical spacers coupling the front edges of the upper and lower side supports, and a rear vertical support structure coupling the upper and lower side supports adjacent to their back edges thereof, the rear vertical supports extending vertically to an elevated location with respect to the upper side supports with a vertical horizontal coupling support therebetween; and a control box supported on the upper surface of the upper horizontal coupling support, the control box having a driver and a jack handle under the control of the operator, the control box also having, associated therewith, a pair of cables with upper and lower ends, the upper ends adapted to be received and moved vertically in response to movement of the jack handle.

4 Claims, 4 Drawing Sheets

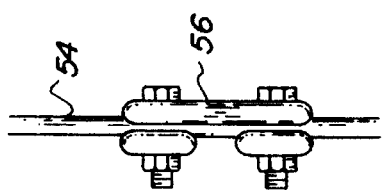
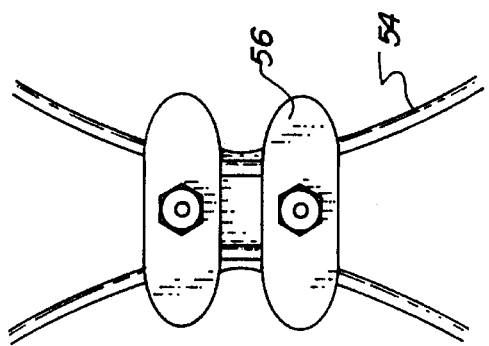
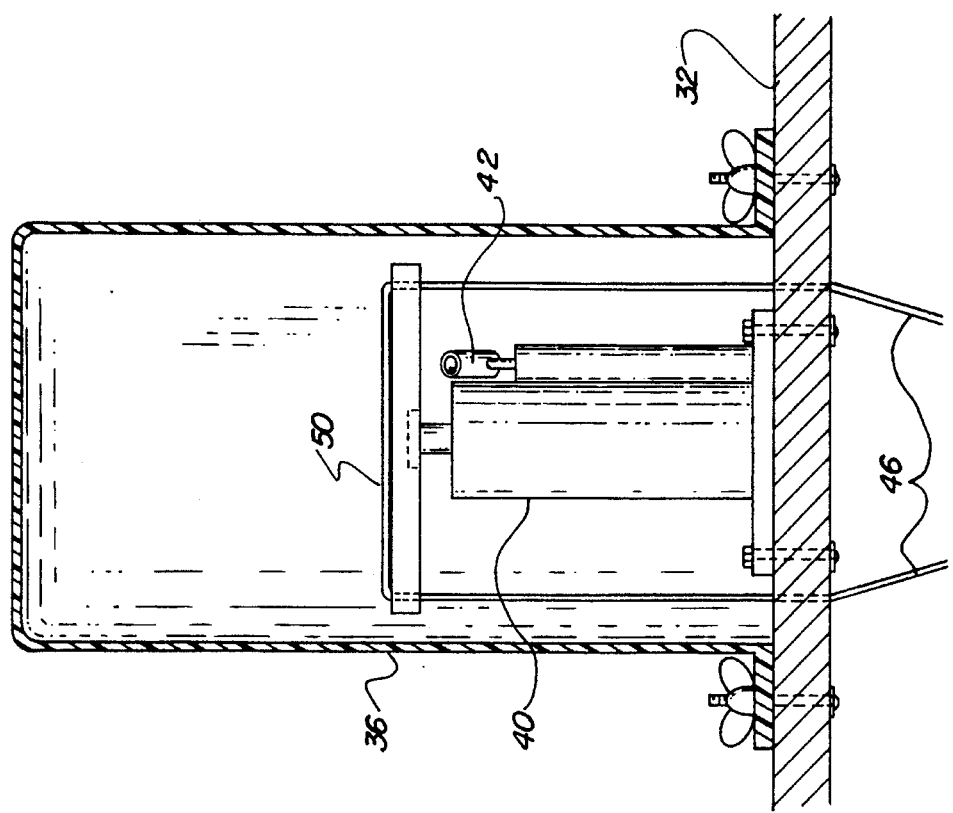

APPARATUS FOR REMOVING AND INSTALLING TOILET BOWLS

BACKGROUND OF THE INVENTION

1. Field of the Invention

The present invention relates to apparatus for removing and installing toilet bowls and more particularly pertains to removing and installing toilet bowls with the aid of a support structure positionable of the toilet bowl receiving area.

2. Description of the Prior Art

The use of an apparatus to assist in removing toilet bowls and for the placement of toilet bowls in at a proper location is known in the prior art. More specifically, an apparatus to assist in removing toilet bowls and for the placement of toilet bowls in at a proper location heretofore devised and utilized for the purpose of removing toilet bowls and installing toilet bowls with the support of various types of mechanisms are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,971,292 to Craig a hoist apparatus.

U.S. Pat. No. 4,722,511 to Chitwood discloses a toilet lift truck.

U.S. Pat. No. 4,491,452 to Matovich discloses a load transporting apparatus.

U.S. Pat. No. 4,183,511 to Marek discloses a work holder for adjustably supporting a workpiece.

U.S. Pat. No. 3,858,864 to Waldow discloses a vehicle door supporting apparatus.

In this respect, the apparatus for removing and installing toilet bowls according to the present invention substantially departs from the conventional concepts and designs of the prior art, and in doing so provides an apparatus primarily developed for the purpose of removing and installing toilet bowls with the aid of a support structure positionable of the toilet bowl receiving area.

Therefore, it can be appreciated that there exists a continuing need for new and improved apparatus for removing and installing toilet bowls which can be used for removing and installing toilet bowls with the aid of a support structure positionable of the toilet bowl receiving area. In this regard, the present invention substantially fulfills this need.

SUMMARY OF THE INVENTION

In view of the foregoing disadvantages inherent in the known types of apparatus to assist in removing toilet bowls and for the placement of toilet bowls in at a proper location now present in the prior art, the present invention provides an improved apparatus for removing and installing toilet bowls. As such, the general purpose of the present invention, which will be described subsequently in greater detail, is to provide a new and improved apparatus for removing and installing toilet bowls and method which has all the advantages of the prior art and none of the disadvantages.

To attain this, the present invention essentially comprises a new and improved apparatus for removing and installing toilet bowls comprising, in combination, a frame assembly formed of a lower rectangular support structure having parallel side supports, a front support and a rear support, an upper support structure having parallel side supports located above the lower side supports and a front support coupled therebetween, vertical spacers coupling the front edges of the upper and lower side supports, and a rear vertical support structure coupling the upper and lower side supports adjacent to their back edges thereof, the rear vertical supports extending vertically to an elevated location with respect to the upper side supports with a vertical horizontal coupling support therebetween; a control box supported on the upper surface of the upper horizontal coupling support, the control box having a pneumatic driver and a jack handle under the control of the operator, the control box also having, associated therewith, a pair of cables with upper and lower ends, the upper ends adapted to be received and moved vertically in response to movement of the jack handle, the lower ends of the cables adapted to be positioned beneath a central extent of a toilet bowl positioned within the support assembly; a plurality of wheels extending downwardly from the corners of the lower frame assembly; and a drip pan positionable beneath the lower support structure to receive dripping water from a toilet after being lifted by the apparatus, the drip pan having parallel flanges at its upper edges and support rails located on the interior surfaces of the lower side supports for the receipt of the drip pan when in use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for removing and installing toilet bowls which have all the advantages of the prior art apparatus to assist in removing toilet bowls and for the placement of toilet bowls in at a proper location and none of the disadvantages.

It is another object of the present invention to provide a new and improved apparatus for removing and installing toilet bowls which may be easily and efficiently manufactured and marketed.

It is further object of the present invention to provide a new and improved apparatus for removing and installing toilet bowls which are of durable and reliable constructions.

An even further object of the present invention is to provide a new and improved apparatus for removing and installing toilet bowls which are susceptible of a low cost of manufacture with regard to both materials and labor, and which accordingly are then susceptible of low prices of sale to the consuming public, thereby making such apparatus for removing and installing toilet bowls economically available to the buying public.

Still yet another object of the present invention is to provide a new and improved apparatus for removing and installing toilet bowls which provide in the apparatuses and methods of the prior art some of the advantages thereof, while simultaneously overcoming some of the disadvantages normally associated therewith.

Still another object of the present invention is to remove and install toilet bowls with the aid of a support structure positionable of the toilet bowl receiving area.

Lastly, it is an object of the present invention to provide new and improved apparatus for removing and installing toilet bowls comprising a frame assembly formed of a lower rectangular support structure having parallel side supports, a front support and a rear support, an upper support structure having parallel side supports located above the lower side supports and a front support coupled therebetween, vertical spacers coupling the front edges of the upper and lower side supports, and a rear vertical support structure coupling the upper and lower side supports adjacent to their back edges thereof, the rear vertical supports extending vertically to an elevated location with respect to the upper side supports with a vertical horizontal coupling support therebetween; and a control box supported on the upper surface of the upper horizontal coupling support, the control box having a driver and a jack handle under the control of the operator, the control box also having, associated therewith, a pair of cables with upper and lower ends, the upper ends adapted to be received and moved vertically in response to movement of the jack handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross sectional view taken along line 6—6 of FIG. 1.

FIG. 7 is an enlarged showing of the cable lock apparatus shown in FIG. 1.

FIG. 8 is a side elevational view of the cable lock illustrated in FIGS. 1 and 7.

The same reference numerals refer to the same parts through the various Figures.

DESCRIPTION OF THE PREFERRED EMBODIMENT

Figure 1:
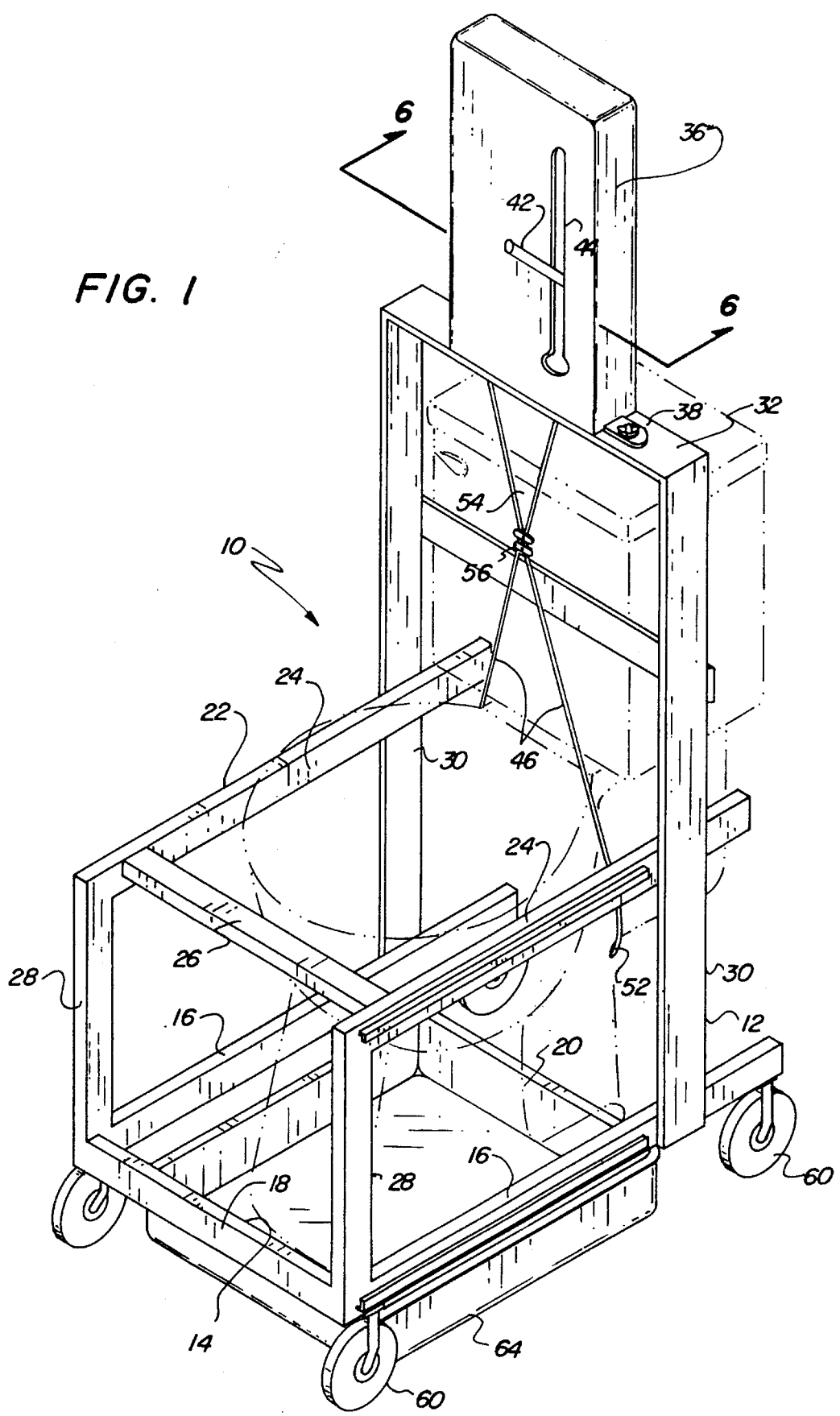
FIG. 1 is a perspective view of the preferred embodiment of the apparatus for removing and installing toilet bowls constructed in accordance with the principles of the present invention.
Figure 3:
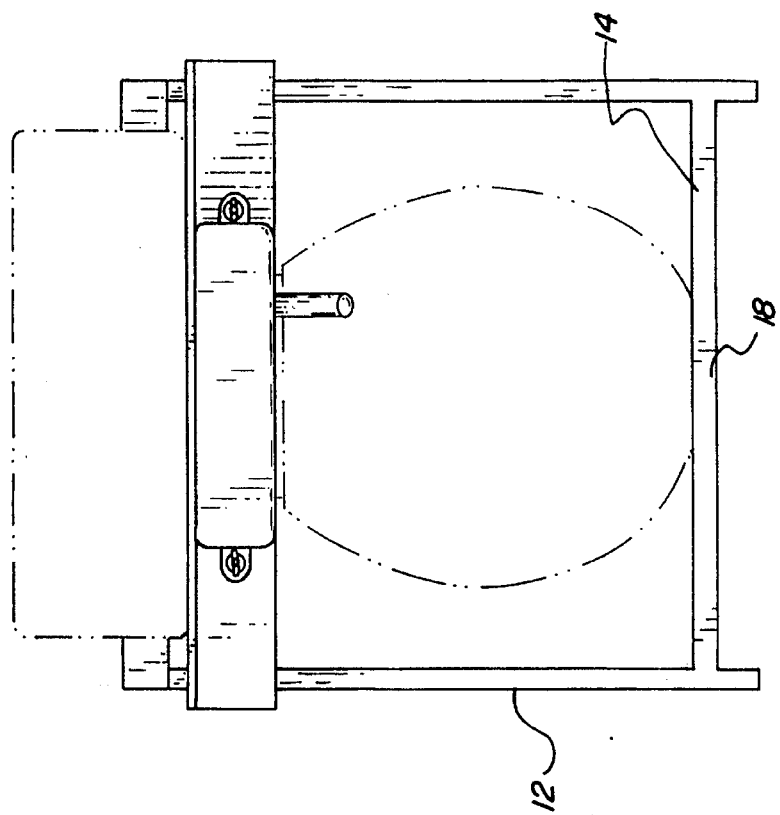
FIG. 3 is a top plan view of the apparatus shown in FIGS. 1 and 2.
Figure 2:
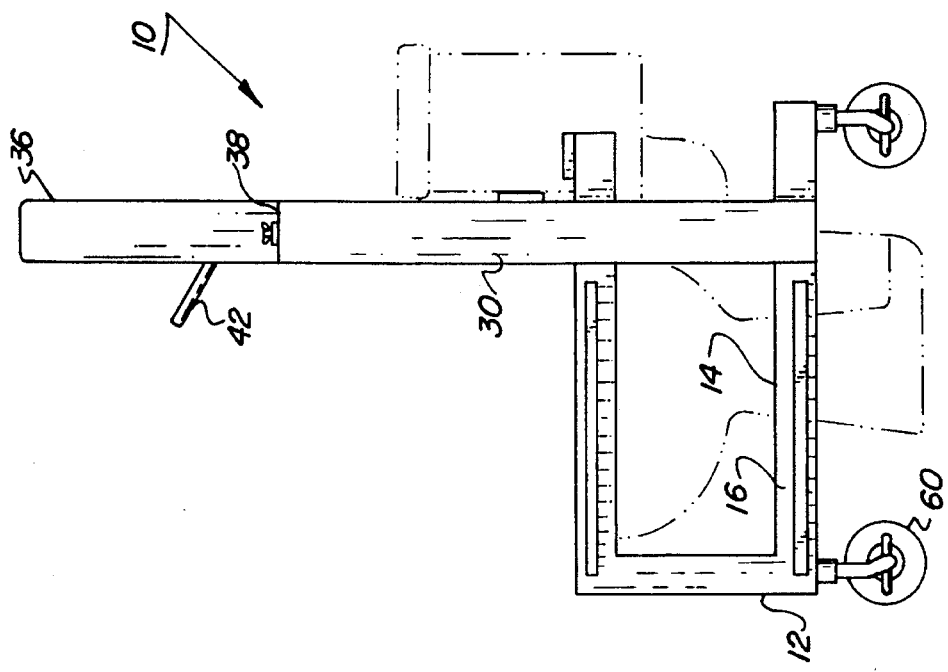
FIG. 2 is a side elevational view of the apparatus shown in FIG. 1.
Figure 5:
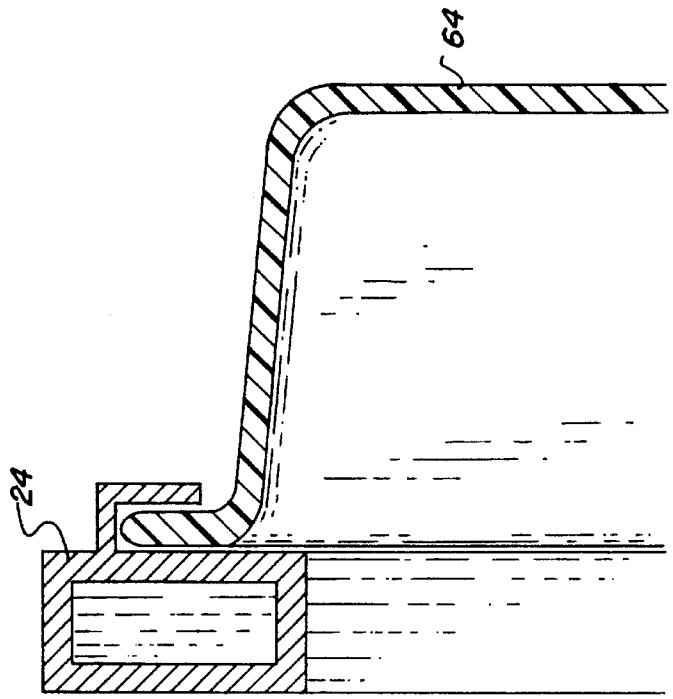
FIG. 5 is a cross sectional view taken along line 5—5 of FIG. 4.
Figure 4:
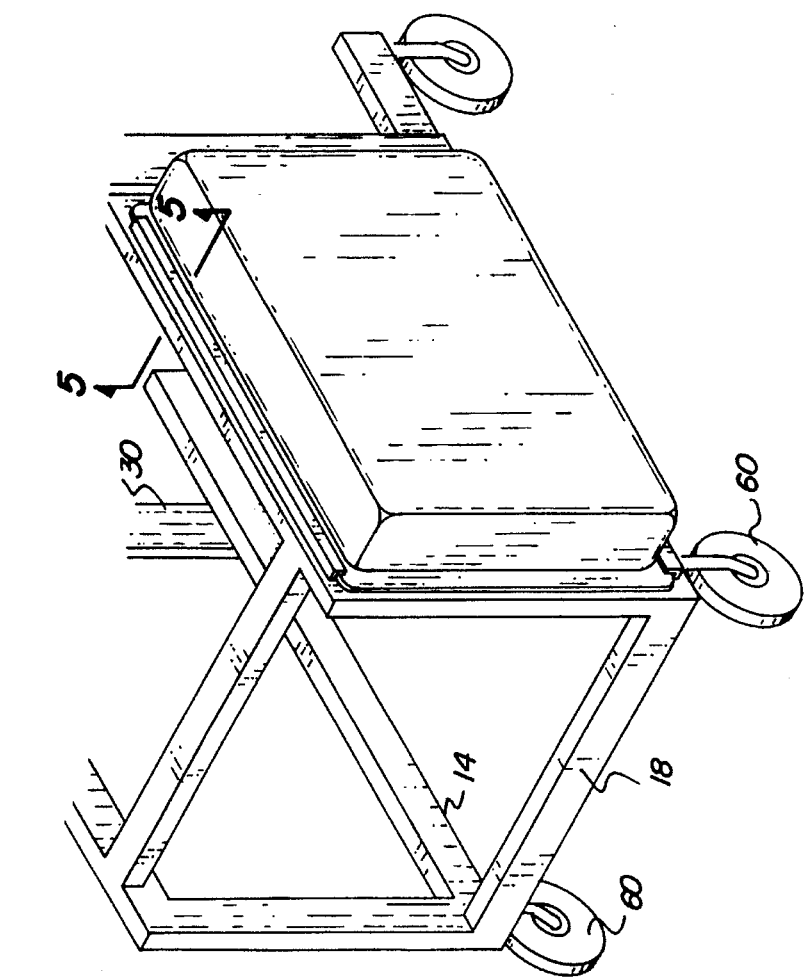
FIG. 4 is a perspective illustration of the lower components of the apparatus shown in the prior Figures.

With reference now to the drawings, and in particular to FIG. 1 thereof, the preferred embodiment of the new and improved apparatus for removing and installing toilet bowls embodying the principles and concepts of the present invention and generally designated by the reference numeral 10 will be described.

The present invention, the new and improved apparatus for removing and installing toilet bowls is comprised of a plurality of component elements. Such component elements is their broadest context, include a frame assembly, a control box, cables, wheels and a drip pan. Such components are individually configured and correlated with respect to each other so as to attain the desired objectives.

More specifically, the system 10 of the present invention includes as its central component a frame assembly 12. Such frame assembly is formed of a lower rectangular structure 14 having parallel side supports 16. Also included are a front support 18. Located above the lower rectangular support structure is an upper support structure 22. The upper support structure has parallel side supports 24 located above the lower side supports. The upper support structure also has a front support 26 coupled between its side supports. Vertical spacers 28 couple the front edges of the upper and lower side supports. In addition, rear vertical supports 30 couple the upper and lower side supports adjacent to their back edges. The rear vertical supports extend vertically to an elevated location with respect to the upper side supports. In addition, a vertical horizontal coupling 32 is located between the rear vertical support at their upper ends.

Next provided in the system 10 is a control box 36. The control box is supported on the upper surface 38 of the upper horizontal coupling support. The control box has a motion imparting mechanism in the form of a driver 40, preferably a pneumatic driver as shown. It also has in association with that a jack handle 42. The jack handle is located forwardly of the control box through a slot 44 so as to be under the control of an operator. The control box also has in association with that a pair of cables 46.

More specifically, the cables are provided with upper and lower ends 50 and 52. The upper ends are adapted to be within the control box and moved vertically in response to the movement of the jack handle. The lower ends of the cables are adapted to be positioned beneath a central extent of a toilet bowl positioned with the support assembly. The cables at an intermediate extent 54 are provided with a clip 56 to hold the central extent and the lower extent of the cables in a close parallel relationship. This allows for a superior result in the handling of toilet bowls by the cables.

Extended utility is provided to the system 10 through the use of wheels 60. A plurality of wheels, preferably four, one extending downward from each corner, are provided for the movement of the frame assembly and system. In this manner, the system may be readily moved to a location to encompass a toilet to be moved. Thereafter it can also be moved while the system 10 is supporting a toilet. The wheels are preferably in the form of casters to allow rotation about a vertical axis as well as the horizontal axis for movement.

The last component of the system is a drip pan 64. The drip pan is adapted to be positioned beneath the lower support structure. It functions to receive dripping water from a toilet after being lifted by the system. The drip pan has horizontally oriented flanges extending outwardly from its upper parallel sided edges. Such flanges are adapted to cooperate with adjacent parallel support rails located on the facing interior surfaces of the lower side supports. The drip pan is not utilized until the toilet to be moved has been lifted to provided space beneath the lifted toilet for the drip pan while being supported by the lower frame structure.

Removing and installing a toilet bowl is a messy and awkward task. After removing all the connecting plumbing, one has to pry off the caps on the bolts holding the bowl to the floor and unscrew the bolts. The bowl is rocked from side to side and lifted. Before installing the new bowl, the old gasket material has to be cleaned from around the toilet bowl's floor flange and a new bowl gasket positioned around the bowl's outlet horn, with the flat surface down on the bottom of the bowl. Then, plumber's putty is put in a 1 inch thick ring around the bowl's bottom rim and new floor flange bolts are installed in the slots in the flange. The bowl is then lowered with the outlet horn centered over the floor flange, pressed down and twisted slightly, left to right, to compress the gasket as the toilet is brought down onto the floor.

Lifting the toilet bowl and then lowering it while aligning it over the floor flange is clumsy and difficult. Frequently, the gasket is damaged while trying to align the bowl over the floor flange. If the installation is allowed to stay, water may leak through the damaged gasket. If not, the bowl gasket has to be replaced and the toilet bowl realigned and reinstalled. The present invention was conceived and a prototype built to alleviate this situation.

The present invention is a rectangular frame that is made from aluminum or steel. The frame is open at the bottom and rear to fit around a toilet bowl and consists of top and bottom horizontal rails on its front and two sides that are supported by upright posts in its four corners. A hydraulic jack is securely mounted on top of a U-shaped frame that extends above the basic frame approximately 1 to 1½ feet. A steel wire or strap is secured to a platform on top of the jack and extends down on both sides to a lifting device. Four locking wheels are at the corners of the frame.

After removing the bolts holding the toilet bowl to the floor, wheel the present invention over, attach the hoist lifting device to the bowl, and operate the hydraulic jack, thus lifting the bowl. A pan can be placed under the toilet to catch any water that may leak. To lower a toilet bowl over the floor flange, wheel the present invention over the bowl, attach the hoist to it, hoist it, move it over the floor flange and align it perfectly, and lower it by operating the hydraulic jack. One person can handle the job easily.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for removing and installing toilet bowls comprising, in combination:

a frame assembly formed of a lower rectangular support structure having parallel side supports, and a front support, an upper support structure having parallel side supports located above the lower side supports and a front support coupled therebetween, vertical spacers coupling the front edges of the upper and lower side supports, and a rear vertical support structure coupling the upper and lower side supports adjacent to their back edges thereof, the rear vertical supports extending vertically to an elevated location with respect to the upper side supports with a vertical horizontal coupling support therebetween;

a control box supported on the upper surface of the vertical horizontal coupling support, the control box having a pneumatic driver and a jack handle under the control of the operator, the control box also having, associated therewith, a pair of cables with upper and lower ends, the upper ends adapted to be received and moved vertically in response to movement of the jack handle, the lower ends of the cables adapted to be positioned beneath a central extent of a toilet bowl positioned within the support assembly;

a plurality of wheels extending downwardly from the corners of the lower rectangular support; and a drip pan positionable beneath the lower support structure to receive dripping water from a toilet after being lifted by the apparatus, the drip pan having parallel flanges at its upper edges and support rails located on the interior surfaces of the lower side supports for the receipt of the drip pan when in use.

2. An apparatus for removing and installing toilet bowls comprising:

a frame assembly formed of a lower rectangular support structure having parallel side supports, and a front support, an upper support structure having parallel side supports located above the lower side supports and a front support coupled therebetween, vertical spacers coupling the front edges of the upper and lower side supports, and a rear vertical support structure coupling the upper and lower side supports adjacent to their back edges thereof, the rear vertical supports extending vertically to an elevated location with respect to the upper side supports with a vertical horizontal coupling support therebetween; and a control box supported on the upper surface of the vertical horizontal coupling support, the control box having a driver and a jack handle under the control of the operator, the control box also having, associated therewith, a pair of cables with upper and lower ends, the upper ends adapted to be received and moved vertically in response to movement of the jack handle.

3. The apparatus as set forth in claim 2 and further including:

a plurality of wheels extending downwardly from the corners of the lower frame assembly.

4. The apparatus as set forth in claim 2 and further including:

a drip pan positionable beneath the lower support structure to receive dripping water from a toilet after being lifted by the apparatus, the drip pan having parallel flanges at its upper edges and support rails located on the interior surfaces of the lower side supports for the receipt of the drip pan when in use.

* * * * *